United States Patent [19]

Sakunaga et al.

[11] Patent Number: 4,732,716
[45] Date of Patent: Mar. 22, 1988

[54] PROCESS FOR PREPARATION OF MULTIFILAMENT OPTICAL FIBERS

[75] Inventors: Kenichi Sakunaga; Hiroshi Terada, both of Otake; Takashi Yamamoto, Saiki; Yasuteru Tahara, Otake, all of Japan

[73] Assignee: Mitsubishi Rayon Company Ltd., Tokyo, Japan

[21] Appl. No.: 879,942

[22] Filed: Jun. 30, 1986

[30] Foreign Application Priority Data

Jun. 28, 1985 [JP] Japan .............................. 60-143002
Jun. 29, 1985 [JP] Japan .............................. 60-142985
Jun. 29, 1985 [JP] Japan .............................. 60-99993[U]

[51] Int. Cl.⁴ .......................... B29D 11/00; G02B 6/00
[52] U.S. Cl. ...................................... 264/1.5; 264/171; 425/131.5; 425/133.1
[58] Field of Search .............................. 264/1.5, 171; 425/131.5, 133.1

[56] References Cited

U.S. PATENT DOCUMENTS

| 3,608,148 | 9/1971 | Sluijtero | 264/171 |
| 3,718,534 | 2/1973 | Okamoto et al. | 264/171 |
| 4,409,154 | 10/1983 | Grenat | 264/1.5 |

FOREIGN PATENT DOCUMENTS 47-36452  9/1972  Japan ................................. 425/131.5

*Primary Examiner*—James Lowe
*Attorney, Agent, or Firm*—Oblon, Fisher, Spivak, McClelland & Maier

[57] ABSTRACT

A process for the preparation of a multifilament optical fiber having 1,000 to 10,000 islands as optical filaments, which comprises using a composite spinning spinneret for the preparation of an islands-in-a-sea type multifilament fiber, which comprises at least three piled orifice plates including an orifice plate having many island-forming nozzle holes, an orifice plate having a sea-forming nozzle hole and an orifice plate having a filament-gathering nozzle hole, the nozzle hole of the orifice plate arranged just above the lowermost orifice plate having a trumpet-shaped opening extending toward the lower end face thereof and a sea component flow passage being formed between two orifice plates arranged just above the lowermost orifice plate, and supplying a thermoplastic polymer for forming cores of optical filaments from the island-forming nozzle holes and a sea-forming thermoplastic polymer from the sea-forming nozzle hole to effect composite spinning and gathering many filaments in the gathering nozzle hole.

10 Claims, 6 Drawing Figures

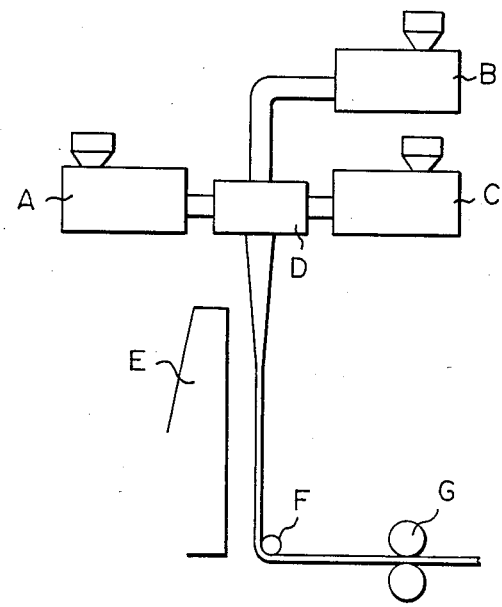
Fig. 3
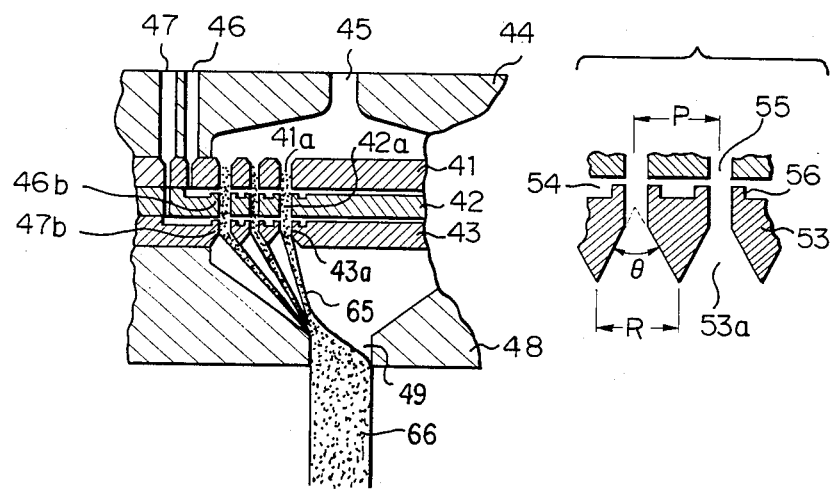
Fig. 4
Fig. 5

PROCESS FOR PREPARATION OF MULTIFILAMENT OPTICAL FIBERS

BACKGROUND OF THE INVENTION

(1) Field of the Invention

The present invention relates to a process for the preparation of a plastic type multifilament optical fiber comprising, as an island component, 1,000 to 10,000 filaments having a diameter smaller than 500μ, especially 50 to 300μ, which are embedded and arranged in a plastic material as a sea component.

(2) Description of the Related Art

A multifilament optical fiber comprising quartz type optical filaments having a diameter smaller than 200μ, which are arranged at a high degree of orientation and having ends thereof bonded to one another by an adhesive, is capable of transmitting an image by light and is widely used as an image scope in the field of medical instruments and as an optical fiber sensor in other industrial fields.

This quartz type multifilament optical fiber is formed by gathering quartz type optical filaments independently prepared. This quartz type optical fiber is disadvantageous in that if there is a slight arrangement error in optical filaments, the optical fiber cannot be used as an image transmitting member at all. Accordingly, a very high precision is required for the preparation process and hence, the manufacturing cost is extremely increased. Furthermore, the quartz type optical fiber is more readily broken than a plastic type optical fiber, and even if one filament is damaged during the preparation of the multifilament quartz type optical fiber, the optical fiber cannot be used as an image transmitting member at all. Accordingly, strict control is required for maintenance of the preparation process. Moreover, quartz type optical filaments are readily broken and this means that the quartz type multifilament optical fiber is often rigid. Therefore, when the optical fiber is used as an image scope, a large bending angle cannot be adopted and the visual field that can be inspected becomes narrow.

On the other hand, a plastic type optical fiber is advantageous in that it is soft and easy to handle, and various multifilament optical fibers comprising plastic optical filaments have been developed. For example, U.S. Pat. No. 3,556,635 discloses a process in which a plastic type multifilament optical fiber is prepared by using a composite spinning nozzle as shown in FIG. 1. This spinning nozzle comprises a core-forming orifice plate 11, a sheath-forming orifice plate 12 and a sea-forming orifice plate 13, which are combined so that spaces 14 and 15 are formed, and pipes 16 and 17 arranged vertically in the respective spaces to introduce the respective components. The multifilament optical fiber prepared according to this process comprises about 100 filaments having a cross-sectional structure shown in FIG. 3 of this patent and described in column 5, lines 23 through 34 and also having a diameter of 100μ, and the matrix occupies about 45% of the total volume. The plastic type multifilament optical fiber can tentatively transmit an image, but since the number of filaments per bundle is as small as about 100 and the matrix content is as high as 45%, the resolving power is smaller than that of the quartz type multifilament optical fiber. Therefore, development of a plastic type multifilament optical fiber having a high optical filament pack density is desired. In addition, the above-mentioned known process is defective in that sheath and sea polymers are likely to stay in dead spaces 18 and 19 of the spinneret. Moreover, the pipes 16 and 17 are arranged for introduction of the respective components and the cross-section of the plastic type multifilament optical fiber prepared by using this spinneret nozzle tends to have a square, hexagonal or octagonal shape. This is another cause of the insufficient image transmitting property of this multifilament optical fiber.

Japanese Unexamined Patent Publication (Kokai) No. 54-116417 teaches that if an improved spinneret 20 as shown in FIG. 2 is used, dead spaces for polymers are not formed at all and an improved plastic type multifilament optical fiber can be obtained, and Japanese Unexamined Patent Publication No. 56-39505 shows a plastic type multifilament optical fiber prepared by using this spinning apparatus. However, the number of optical filaments in the plastic type multifilament type optical fiber prepared according to this process is smaller than 200 and the matrix content is as high as 20 to 30%. Moreover, deviations of the cross-sectional shape and fineness are great among the optical filaments as the island component, and therefore, a further improvement is required so as to utilize this plastic type multifilament optical fiber as an image transmitting member.

SUMMARY OF THE INVENTION

It is therefore a primary object of the present invention to provide a process in which a plastic type multifilament optical fiber comprising 1,000 to 10,000 islands as optical filaments and having a matrix content lower than 30%, which has a high optical filament pack density and a good image resolving power, is prepared at a high efficiency.

In accordance with the present invention, there is provided a process for the preparation of a multifilament optical fiber having 1,000 to 10,000 islands as optical filaments, which comprises using a composite spinning spinneret for the preparation of an islands-in-a-sea type multifilament fiber, which comprises at least three piled orifice plates including an orifice plate having many island-forming nozzle holes, an orifice plate having a sea-forming nozzle hole and an orifice plate having a filament-gathering nozzle hole, the nozzle hole of the orifice plate arranged just above the lowermost orifice plate having a trumpet-shaped opening extending toward the lower end face thereof and a sea component flow passage being formed between two orifice plates arranged just above the lowermost orifice plate, and supplying a thermoplastic polymer for forming cores of optical filaments from the island-forming nozzle holes and a sea-forming thermoplastic polymer from the sea-forming nozzle hole to effect composite spinning and gathering many filaments in the gathering nozzle hole.

BRIEF DESCRIPTION OF THE DRAWINGS

FIG. 3 is a schematic diagram illustrating a spinning apparatus for use in carrying out the present invention.

FIG. 4 is a sectional view showing an example of a spinneret for use in carrying out the present invention.

FIG. 5 is an enlarged view showing a sea-forming orifice plate of the spinneret shown in FIG. 4.

DESCRIPTION OF THE PREFERRED EMBODIMENTS

Figure 1:
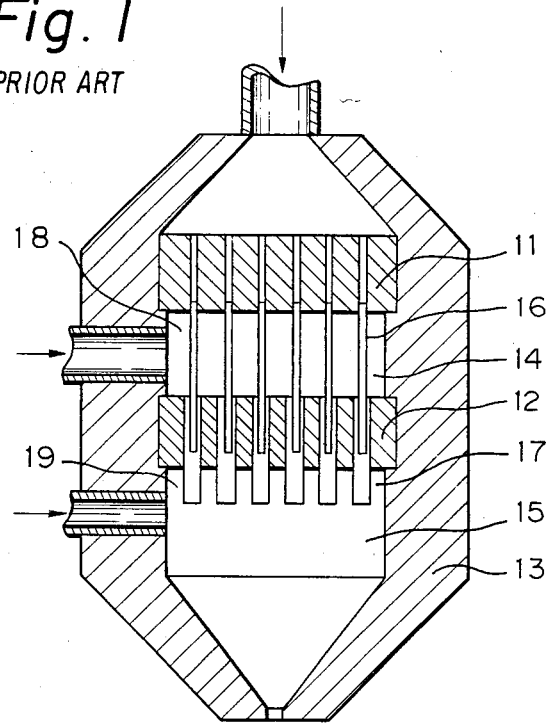
FIG. 1 is a sectional view illustrating a conventional composite spinning nozzle for the production of a plastic type multifilament optical fiber.

FIG. 3 is a schematic diagram illustrating a spinning apparatus for use in carrying out the present invention. In this apparatus, a sea component polymer and a core component polymer constituting islands are supplied to melt extruders A, B and C, and molten polymers are separately fed into a spinneret D, and islands comprising a core and a sheath are first formed. Then, the islands are gathered by the polymer constituting the sea and an islands-in-a-sea type fiber comprising gathered core-sheath filaments is spun. The molten assembly formed by the spinneret D is cooled and solidified by a quenching device E, and the resulting fiber is taken up at a constant speed by a take-up roll G through a guide roll F, whereby a plastic type multifilament optical fiber is obtained.

FIG. 4 is a sectional view illustrating an example of the spinneret for use in carrying out the present invention. This spinneret is a composite spinneret for the production of an islands-in-a-sea type multifilament fiber, which comprises four piled orifice plates, that is, an orifice plate 41 for forming cores of optical filaments, a sheath-forming orifice plate 42, a seaforming orifice plate 43 and an orifice plate 48 for gathering optical filaments. Even if the sheath-forming orifice plate 42 is removed in this spinneret apparatus, the intended plastic type multifilament optical fiber of the present invention can be prepared. However, in order to obtain a multifilament optical fiber providing a sharp image and having a high resolving power, it is preferred that this sheath-forming orifice plate 42 be used in combination with other orifice plates. Moreover, a protecting layer-forming orifice plate may be arranged between the sea-forming orifice plate 43 and the sheath-forming orifice plate 42.

In FIG. 4, reference numerals 41a, 42a and 43a represent a spinning hole for the core component, a spinning hole for the sheath component and the spinning hole for the sea component, respectively.

Figure 6:
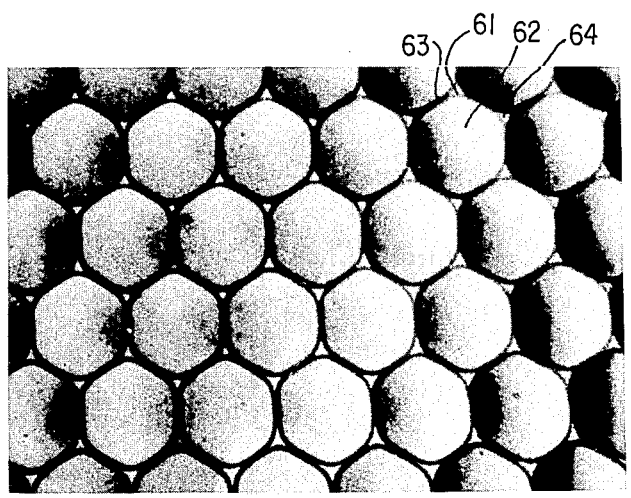
FIG. 6 is a view showing the cross-section of a multifilament optical fiber prepared according to the process of the present invention.

FIG. 6 is an enlarged view of the central portion of a multifilament optical fiber prepared according to the process of the present invention. Many islands 61 are composed of a core 62 and a sheath 63 and are bound integrally by the sea 64. As shown in FIG. 4, the core-forming polymer is supplied from the holes 41a and the sheath-forming polymer is supplied from the holes 46 to form the sheath-core structure islands, and at the same time, the sea-forming polymer is supplied from the holes 47 to the periphery of the islands to form many composite filaments 65 of a three-layered cross-sectional structure consisting of a core, a sheath surrounding the core and a sea surrounding the sheath. These many composite filaments thus formed are gathered in one body at the gathering hole 49 to form a multifilament optical fiber 66 of the cross-sectional configuration as shown in FIG. 6.

One of the characteristic features of this spinneret resides in the shape of the spinning hole 43a of the orifice plate arranged just above the lowermost orifice plate, that is, the sea-forming orifice plate 43 arranged just above the filament-gathering orifice plate 48. The shape is shown in an enlarged view of FIG. 5. In FIG. 5, reference numeral 53 represents a sea-forming orifice plate and reference numeral 53a represents a sea component spinning hole. It is indispensable that the sea component spinning hole 53a should have a trumpet-shaped opening extending toward the lower face of the sea-forming orifice plate 53, as shown in FIG. 5. It is especially preferred that the lower portion of the spinning hole 53a be downwardly expanded. Furthermore, it is preferred that the lower end of the spinning hole should define two adjacent openings.

It is preferred that the spinning hole 53a be formed so that the relations of $R \geq P$ and especially $2P \geq R$ are established between the distance P between the centers of two adjacent holes and the diameter R of the lower end of the spinning hole 53a. Furthermore, it is preferred that the relation of $R = \sqrt{P^2/3}$ be established. The angle $\theta$ of the trumpet-shaped opening of the spinning hole 53a is preferably in the range of $10° < \theta < 45°$.

If the above-mentioned orifice structure is adopted, the molten polymers flow very smoothly at the joint point of the island component and sea component, and laminar flows of the island component and sea component are substantially maintained in each spinning hole and hence, a high circularity can be given to the section of the island component, with the result that the cross-sectional shape of the obtained multifilament optical fiber is much more uniform than in the conventional products, as shown in FIG. 6.

If the spinning hole of the sea-forming orifice has a trumpet-shaped opening extending to the lower end face of the orifice as specified in the present invention, the islands-in-a-sea fiber in the plasticized state separates from the sea-forming nozzle in a good condition without meandering or eccentricity. Accordingly, occurrence of uneven fineness or insufficient circularity can be effectively prevented and the uniformity of the islands-in-a-sea fiber can be highly improved. If these filaments are gathered by the filament-gathering orifice plate, there can be obtained a multifilament optical fiber in which optical filaments are uniform and the content of the matrix component is maintained below 30%, and which has a good resolving power.

Figure 2:
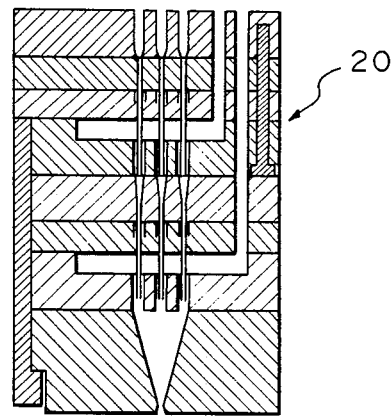
FIG. 2 is a sectional view illustrating another conventional spinneret for the production of a plastic type multifilament optical fiber.

In the above-mentioned spinneret, it is preferred that at the joint point between the sea component flow passage 54 and the island-forming nozzle hole 55, a slit-shaped opening be formed between a projection 56 formed on the end of the sea component flow passage and the lower face of the orifice plate arranged just above the sea-forming orifice plate. In the conventional spinneret as shown in FIG. 1 or 2, pipes are vertically arranged in this joint point and eccentricity, deviation or shaking of molten polymer flows is readily caused by these pipes. In contrast, in the spinneret of the present invention having the above-mentioned specific structure, occurrence of this undesirable phenomenon is effectively prevented, and formation of uniform sea-island interfaces and reduction of the thickness of the layer of the sea component become possible.

If this slit structure is also formed at the joint point of the orifices for forming the core and sheath of the optical filament and at the joint point of the orifices for forming the sheath and the protecting layer, the intended object of the present invention can be attained more efficiently.

The preparation of the multifilament optical fiber by using the spinneret apparatus shown in FIG. 4 will now be described. A core-forming polymer for formation of islands of the multifilament optical fiber is supplied from a supply opening 45 of a distributing plate 44 and is spun out from many spinning holes 41a formed in the core-forming orifice plate 41. A polymer for forming the sheath as the other component of the island is supplied from a supply opening 46 of the distributing plate 44 and uniformly covers the periphery of the core layer flowing from the upper portion through a distributing slit 46b to form a uniform core sheath structure of the island as an optical filament. The sea-forming polymer is supplied from the supply opening 47 of the distributing plate 44 through the distributing slit 47b and covers the periphery of the island flowing from above to form an optical filament having an islands-in-a-sea structure, and the filament flows downward very smoothly from the trumpet-shaped opening 43a. These filaments are gathered and integrated at the spinning opening 49 of the filament gathering orifice plate to form a multifilament optical fiber according to the present invention.

According to the process of the present invention, it is possible to prepare a plastic multifilament optical fiber which comprises at least 1,000 optical filaments having a diameter of 5 to 500μ and has a matrix content lower than 30% and a good resolving power, though preparation of such a plastic multifilament optical fiber is considered impossible according to the conventional techniques. Furthermore, the cross-section of each of the filaments contained in this multifilament optical fiber is substantially equal and the variation of the fineness is very small.

As the organic substance to be used for the core of the optical filament as the island in the multifilament optical fiber of the present invention, an amorphous transparent polymer is preferable. For example, a homopolymer of methyl methacrylate and a copolymer of at least 70% by weight of methyl methacrylate with up to 30% by weight of a monomer copolymerizable with methyl methacrylate, such as methyl acrylate or ethyl acrylate, a copolymer of a methacrylic acid ester such as cyclohexyl methacrylate, t-butyl methacrylate, norbornyl methacrylate, adamantyl methacrylate, benzyl methacrylate, phenyl methacrylate or naphthyl methacrylate with a monomer copolymerizable therewith, a polycarbonate, polystyrene, a styrene/methacrylic acid ester copolymer, and deuteration products of these polymers formed by substituting all or parts of hydrogen atoms of these polymers by deuterium atoms, are preferably used. Of course, other transparent polymers, transparent core polymers and transparent blends may be used.

As the sheath of the optical filament as the island in the multifilament optical fiber of the present invention, there is ordinarily used a substantially transparent polymer having a refractive index smaller by at least 0.01 than the refractive index of the core polymer. It is preferred that a polymer having a refractive index smaller by 0.01 to 0.15 than that of the core polymer be selected and used as the sheath polymer. The kind of the sheath polymer is not particularly critical and any of known sheath polymers may be used. For example, when a homopolymer or copolymer of methyl methacrylate is used as the core polymer, a polymer obtained by polymerizing an ester of methacrylic acid with a fluorinated alcohol, as disclosed in Japanese Examined Patent Publication (Kokai) No. 43-8978, No. 56-8321, No. 56-8322 and No. 56-8323 and Japanese Unexamined Patent Publication (Kokai) No. 53-60243, can be used. When a polycarbonate or polystyrene is used as the core polymer, for example, poly(methyl methacrylate) can be used. As another example of the sheath polymer, there can be mentioned a vinylidene fluoride type polymer as disclosed in Japanese Examined Patent Publication (Kokoku) No. 43-8978 or No. 53-42260. Furthermore, a vinylidene fluoride/hexafluoropropylene copolymer, a polymer of a methacrylic acid ester other than methyl methacrylate mentioned above and a methylpentene type polymer can be used as the sheath.

In the present invention, it is preferred that the sea component be composed of such an organic polymeric substance that the melt flow rate $[MFR]_2$ of the organic polymeric substance is equal to or larger than the melt flow rate $[MFR]_1$ of the core component of the island, so that at the time of melt-shaping for forming the islands-in-a-sea structure, the islands are kept as circular as possible while preventing occurrence of the deformation. In order to maintain a high circularity in the islands, it is mainly important that the above relation should be established between the melt flow rate $[MFR]_1$ of the core component and the melt flow rate $[MFR]_2$ of the sea component, and the melt flow rate $[MFR]_3$ of the sheath component is important for maintaining a high light transmitting property. More specifically, it is preferred that the melt flow rate $[MFl]_3$ of the sheath component be intermediate between the melt flow rate $[MFR]_2$ of the sea component and the melt flow rate $[MFR]_1$ of the core component.

Organic polymeric substances satisfying such requirements are selected, for example, from polyamides, polyester elastomers, nylon elastomers, polystyrene elastomers, polyolefin elastomers, poly-4-methylpentene-1, polyvinylidene fluoride, ionomers, ethylene/ethyl acrylate copolymers, ethylene/vinyl acetate copolymers, polyvinylidene fluoride copolymers, highly flowable polymethyl methacrylate, polystyrene, polycarbonate, ABS, polybutylene terephthalate and polyethylene.

The melt flow rate [MFR] referred to in the present invention can be determined according to JIS (Japanese Industrial Standards) K-7210-1976, ASTM (American Society for Testing and Materials) D-1238-82 and ISO (International Organization for Standarization) 1133. For example, according to JIS K-7210-76, the method A (manual cutting method) is adopted and the measurement is carried out at a test temperature of 230° C. under a test load of 5 Kg. Other conditions are a die length of 8.000±0.025 mm and a die inner diameter of 2.095±0.005 mm. The amount packed of the sample is 5 g, and in case of the method A, the sample collecting time is about 30 seconds.

Furthermore, when the measurement is carried out according to ASTM D-1238-82 and ISO 1133, test and measurement conditions specified in these standards are adopted, and measurement devices, tools and procedures are determined within the ranges specified by these standards.

The light transmitting gathered fiber has a small light transmission loss and is hence excellent. In order to provide an optimum image transmitting member, it is preferred that the light transmission loss is smaller than 3,000 dB/Km, especially smaller than 1,300 dB/Km, particularly especially smaller than 500 dB/Km.

An image transmitting member formed by using the light transmitting gathered fiber transmits an image by visible rays, and it is preferred that the transmission loss in the visible region be within the above-mentioned range. It is known that in case of a light transmitting gathered fiber having a transmission loss of 1,300 dB/Km, when an image is transmitted along a distance of 1 m, the light quantity is reduced to 74%, and it also is known that in case of a light transmitting gathered fiber having a transmission loss of 500 dB/Km, when an image is transmitted along a distance of 1 m, the light quantity is reduced to 89%.

An image scope comprising a plastic type optical fiber is often used for transmitting an image along a distance of scores of centimeters to several meters. When a practical distance is considered based on the above-mentioned reduction of the light quantity, it is seen that the transmission distance causing 50% reduction of the light quantity is 2.3 m at 1,300 dB/Km, 6 m at 500 dB/Km and 1 m at 3,000 dB/Km. Accordingly, it is preferred that the transmission loss be smaller than 3,000 dB/Km.

The resolving power can be mentioned as a factor having a relation to the capacity of the image transmitting member. There are various methods for determining the resolving power, but when an image is transmitted, the resolving power is most directly determined according to a method in which the devitation between the positions of an original image and a transmitted image is measured.

This image is transmitted as a two-dimensional plane. Accordingly, when the light transmitting gathered fiber is vertically cut in the longitudinal direction, supposing that the central points of the filament at the position of the i-th line in the lateral direction and j-th line in the longitudinal direction on both the end faces of the gathered fiber are designated as X(i,j) and Y(i,j), the positional deviation between the original image and the transmitted image is expressed by the following formulae:

$$\left| \frac{X(i,j)}{X(m,j)} - \frac{Y(i,j)}{Y(m,j)} \right| \quad (i = 1 \sim m, j = 1 \sim n)$$

with respect to the lateral direction, and $$\left| \frac{X(i,j)}{X(i,n)} - \frac{Y(i,j)}{Y(i,n)} \right| \quad (i = 1 \sim m, j = 1 \sim n)$$

with respect to the longitudinal direction.

In the above formulae, m stands for the number of filaments on the j-th line in the longitudinal direction and n stands for the number of filaments on the i-th line in the lateral direction.

As a result of our research, it was found that in order to attain a high resolving power in the light transmitting gathered fiber, it is preferred that the deviation between the central points of the positions of the original image and the transmitted image should satisfy the following requirements:

$$\left| \frac{X(i,j)}{X(m,j)} - \frac{Y(i,j)}{Y(m,j)} \right| < \frac{3}{m} \quad (i = 1 \sim m, j = 1 \sim n)$$

and $$\left| \frac{X(i,j)}{X(i,n)} - \frac{Y(i,j)}{Y(i,n)} \right| < \frac{3}{n} \quad (i = 1 \sim m, j = 1 \sim n)$$

especially, $$\left| \frac{X(i,j)}{X(m,j)} - \frac{Y(i,j)}{Y(m,j)} \right| < \frac{2}{m} \quad (i = 1 \sim m, j = 1 \sim n)$$

and $$\left| \frac{X(i,j)}{X(i,n)} - \frac{Y(i,j)}{Y(i,n)} \right| < \frac{2}{n} \quad (i = 1 \sim m, j = 1 \sim n)$$

particularly especially, $$\left| \frac{X(i,j)}{X(m,j)} - \frac{Y(i,j)}{Y(m,j)} \right| < \frac{1}{m} \quad (i = 1 \sim m, j = 1 \sim n)$$

and $$\left| \frac{X(i,j)}{X(i,n)} - \frac{Y(i,j)}{Y(i,n)} \right| < \frac{1}{n} \quad (i = 1 \sim m, j = 1 \sim n)$$

The present invention will now be described in detail with reference to the following examples that by no means limit the scope of the invention.

EXAMPLE 1

A light transmitting gathered fiber was prepared by using a spinning apparatus as shown in FIG. 3, to which a spinneret having 3,000 spinning holes, as shown in FIG. 4, was attached. In the spinneret, the downward expansion angle $\theta$ in the trumpet-shaped openings between the lower ends of every two adjacent sea-forming polymer-extruding holes, where the sea component and island component joined, was 15°, and the pitch of the openings was 2 mm and the diameter of the lower ends was 2.5 mm.

Poly(methyl methacrylate) having a refractive index n of 1.492 and a melt flow rate $[MFR]_1$ of 1.2 was used as the core, a vinylidene fluoride copolymer having a refractive index n of 1.402 and a melt flow rate $[MFR]_3$ of 6 was used as the sheath, and poly(methyl methacrylate) having a refractive index n of 1.492 and a melt flow rate $[MFR]_2$ of 10.5 was used as the sea component.

The poly(methyl methacrylate) as the core, the vinylidene fluoride copolymer as the sheath and the poly(methyl methacrylate) as the sea component were supplied and molten in melt extruders, and the core polymer, sheath polymer and sea polymer were supplied to the composite spinneret, whereby a light transmitting gathered fiber was obtained.

Each of optical filaments forming the islands of the so-obtained light transmitting gathered fiber had a diameter of 50μ, and in the cross-section, the core was clearly distinguished from the sheath and the cross-section had a substantially circular shape. The matrix content was about 12%.

$$\left| \frac{X(i,j)}{X(m,j)} - \frac{Y(i,j)}{Y(m,j)} \right| \text{ was less than } 0.015$$

and $$\left| \frac{X(i,j)}{X(i,n)} - \frac{Y(i,j)}{Y(i,n)} \right| \text{ was less than } 0.016$$

It was found that the transmission loss of the gathered fiber was 310 dB/Km, and an image could be sufficiently transmitted along a distance of 10 m.

EXAMPLE 2

A light transmitting gathered fiber was prepared by using the same apparatus as used in Example 1 except that a spinneret having 1,500 holes was attached.

Poly(methyl methacrylate) having a refractive index n of 1.492 and a melt flow rate $[MFR]_1$ of 1.2 was used as the core, a vinylidene fluoride copolymer having a refractive index n of 1.402 and a melt flow rate $[MFR]_3$ of 6 was used as the sheath, poly(methyl methacrylate) having a refractive index n of 1.492 and a melt flow rate $[MFR]_2$ of 10.5 was used as the sea component, and polyethylene having a melt flow rate $[MFR]_4$ of 8, in which 5% by weight of carbon was incorporated, was used as the protecting layer component.

The poly(methyl methacrylate) as the core, the vinylidene fluoride as the sheath, the poly(methyl methacrylate) as the sea component and the polyethylene as the protecting layer component were supplied and molten in melt extruders. The core polymer, the sheath polymer, the sea polymer and the protecting layer-forming polymer were supplied to the composite spinneret having 1,500 holes, whereby a light transmitting gathered fiber was obtained.

The so-obtained light transmitting gathered fiber had a rectangular cross-section having a width of 1 mm and a height of 0.5 mm, and in the filaments constituting islands, the transmission loss was 450 dB/Km in the peripheral portion and 440 dB/Km in the central portion. Accordingly, the deviation of the light quantity was very small, and a very clear transmitted image could be obtained. For comparison, a gathered fiber was prepared in the same manner as described above except that the protecting layer was not formed. The transmission loss was 700 dB/Km in the peripheral portion and 350 dB/Km in the central portion, and the light quantity greatly differed according to the position.

Incidentally, in the gathered fiber obtained in this example, $$\left| \frac{X(i,j)}{X(m,j)} - \frac{Y(i,j)}{Y(m,j)} \right| \text{ was less than } 0.03$$

and $$\left| \frac{X(i,j)}{X(i,n)} - \frac{Y(i,j)}{Y(i,n)} \right| \text{ was less than } 0.03.$$

We claim:

1. A process for the preparation of an islands-in-a-sea type multifilament optical fiber having 1,000 to 10,000 islands as optical filaments, which comprises using a composite spinning spinneret for the preparation of an islands-in-a-sea type multifilament fiber, which comprises four piled orifice plates consisting of an being arranged in the order of an uppermost core-forming orifice plate having many core-forming nozzle holes, a sheath-forming orifice plate having many sheath-forming nozzle holes, a sea-forming orifice plate having many sea-forming nozzle holes and a lowermost optical filaments-gathering orifice plate having a gatering hole, the nozzle holes of the sea-forming orifice plate having a trumpet-shaped opening extending toward the lower end face thereof and a sea component flow passage being formed between the sheath- and sea-forming orifice plates, and supplying a thermoplastic polymer for forming the cores of the optical filaments from the core-forming nozzle holes, a thermoplastic polymer for forming the sheathes of the optical filaments from the sheath-forming nozzle holes and a sea-forming thermoplastic polymer from the sea-forming nozzle holes to effect and composite spinning and gathering of many filaments in the gathering hole.

2. A process for the preparation of an islands-in-a-sea type multifilament optical fiber according to claim 1, wherein each island comprises a sheath-core type optical filament, a sheath component flow passage is formed between the core- and sheath-forming orifice plates, a sea component flow passage is formed between the sheath-and sea-forming orifice plates, the core-forming thermoplastic polymer is supplied from the core-forming nozzle holes, the sheath-forming thermoplastic polymer is supplied through the sheath component flow passage, and the sea-forming thermoplastic polymer is supplied through the sea component flow passage to effect spinning and form an islands-in-a-sea type multifilament fiber containing sheath-core type filaments as the islands.

3. A process for the preparation of an islands-in-a-sea type multifilament optical fiber according to claim 1, wherein at the outlets of the sheath component flow passage are formed slits surrounding the sheath-forming nozzle holes.

4. A process for the preparation of an island-in-a-sea type multifilament optical fiber according to claim 1, wherein at the outlets of the sea component flow passage are formed slits surrounding the sea-forming nozzle holes.

5. A process for the preparation of an islands-in-a-sea type multifilament optical fiber according to claim 1, wherein composite spinning is carried out while selecting resins so that the melt flow rate $[MFR]_2$ of the sea-forming thermoplastic resin and the melt flow rate $[MFR]_1$ of the core-forming thermoplastic resin satisfy the following requirement:

$$[MFR]_2 \geq [MFR]_1$$

6. A process for the preparation of an island-in-a-sea type multifilament optical fiber according to claim 1, wherein composite spinning is carried out while selecting resins so that the melt flow rate $[MFR]_2$ of the sea-forming themoplastic resin, the melt flow rate $[MFR]_1$ of the core-forming thermoplastic resin and the melt flow rate $[MFR]_3$ of the sheath-forming thermoplastic resin satisfy the folloing requirement:

$$[MFR]_2 \geq [MFR]_3 \geq [MFR]_1$$

and the refractive index $n_1$ of the core-forming thermoplastic resin and the refractive index $n_2$ of the sheath-forming thermoplastic resin satisfy the following requirement:

$$n_1 - n_2 \geq 0.01$$

7. A process for the preparation of an islands-in-a-sea type multifilament optical fiber according to claim 1, wherein the distance P between centers of two adjacent sea-forming nozzle holes and the diameter R of the end of each trumpet-shaped opening of the sea-forming orifice plate satisfy the following requirement:

$$2P \geq R \geq P$$

8. A process for the preparation of an island-in-a-sea type multifilament optical fiber according to claim 1, wherein the distance P between centers of two adjacent sea-forming nozzle holes and diameter R of the end of each trumpet-shaped opening of the sea-forming orifice plate satisfy the following requirement:

$$R = \sqrt{P^2/3}.$$

9. A process for the preparation of an islands-in-a-sea type multifilament optical fiber according to claim 1, wherein at the outlets of the sheath component flow passage are formed slits surrounding the sheath-forming nozzle holes, and at the outlets of the sea component flow passage are formed slits surrounding the sea-forming nozzle holes.

10. A process for the preparation of an islands-in-a-sea type multifilament optical fiber, which comprises using a composite spinning spinneret for the preparation of an islands-in-a-sea type multifilament fiber, which comprises four piled orifice plates consisting of and arranged in the order of an uppermost core-forming orifice plate having many core-forming nozzle holes, a sheath-forming orifice plate having many sheath-forming nozzle holes, a sea-forming orifice plate having many sea-forming nozzle holes and a lowermost optical filaaments-gathering orifice plate having a gathering hole, the nozzle holes of the sea-forming orifice plate having a trumpet-shaped opening extending toward the lower end face thereof and a sea component flow passage being formed between the sheath-and sea-forming orifice plates, and supplying a thermoplastic polymer for forming the cores of the optical filaments for the core-forming nozzle holes, a thermoplastic polymer for forming the sheathes of the optical filaments from the sheath-forming nozzle holes and a sea-forming thermoplastic polymer from the sea-forming nozzle holes to effect a composite spinning and gathering of many filaments in the gathering hole, wherein composite spinning is carried out while selecting resins so that the melt flow rate $[MFR]_2$ of the sea-forming thermoplastic resin, the melt flow rate $[MFR]_1$ of the core-forming thermoplastic resin and the melt flow rate $[MFR]_3$ of the sheath-forming thermoplastic resin satisfy the following requirement:

$$[MFR]_2 \geq [MFR]_3 \geq [MFR]_1$$

and the refractive index $n_1$ of the core-forming thermoplastic resin and the refractive index $n_2$ of the sheath-forming thermoplastic resin satisfy the following requirement:

$$n_1 - n_2 \geq 0.01$$

whereby the sheath-core structure islands in the sea are arranged so that the deviation between the positions (i, j) of the central point in the directions of axes X and Y on both the end faces of the gathered fiber satisfies the following requirements:

$$\left| \frac{X(i,j)}{X(m,j)} - \frac{Y(i,j)}{Y(m,j)} \right| < \frac{3}{m}$$

and $$\left| \frac{X(i,j)}{X(i,n)} - \frac{Y(i,j)}{Y(i,n)} \right| < \frac{3}{m}$$

wherein i is an integer of from 1 to m, and j is an integer of from 1 to n.

* * * * *